Patented Nov. 30, 1943

2,335,651

UNITED STATES PATENT OFFICE 2,335,651

POLYMERS AND COPOLYMERS OF VINYL ESTERS OF HALO-PHENOXY SUBSTITUTED ALIPHATIC MONOCARBOXYLIC ACIDS

Gaetano F. D'Alelio, Pittsfield, Mass., assignor to General Electric Company, a corporation of New York No Drawing. Application February 17, 1942, Serial No. 431,290

15 Claims. (Cl. 260—78)

This invention relates to the production of new polymers and more particularly to polymers and copolymers of vinyl esters of halo-phenoxy substituted aliphatic monocarboxylic acids corresponding to the formula:

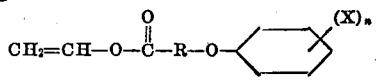

In the above formula X is a halogen selected from the class consisting of chlorine and bromine, $n$ is an integer which is at least one and not more than five, and R is a divalent aliphatic hydrocarbon radical such as, for example, methylene, ethylene, ethylidene, propylene, propylidene, tetramethylene, butylidene, methyl ethylene, ethyl ethylene, pentamethylene, amylidene, methyl butylene, ethyl propylene, propyl ethylene, hexylene, decamethylene, etc. Although R may be any divalent aliphatic radical, for practical and economic reasons, I prefer to use those vinyl esters in which R contains not more than six carbon atoms. The vinyl esters used in carrying the present invention into effect are more fully described and claimed in my copending application Serial No. 431,291, filed concurrently herewith, and assigned to the same assignee as the present invention. Such vinyl esters may be prepared by various methods as disclosed in the said copending application. One method comprises effecting reaction between a halo-phenoxy substituted aliphatic acid and acetylene in the presence of a mercuric salt. Another method comprises the reaction of a vinyl ester of a halogenated aliphatic acid and an alkali metal salt of a halogenated phenol, the reaction being carried out in an ethyl alcohol solution or in a mixture of ethyl alcohol and water, depending on the solubility of the vinyl ester. A third method involves the acid radical interchange of a vinyl ester, e. g., vinyl acetate, and a halo-phenoxy substituted aliphatic acid.

Specific examples of vinyl esters of halo-phenoxy substituted aliphatic monocarboxylic acids that may be used in producing my new polymerization products are listed below:

Vinyl monochloro-phenoxy acetate
Vinyl monobromo-phenoxy acetate
Vinyl dibromo-phenoxy acetate
Vinyl trichloro-phenoxy acetate
Vinyl tetrabromo-phenoxy acetate
Vinyl pentachloro-phenoxy acetate
Vinyl monobromo-phenoxy propionate
Vinyl dichloro-phenoxy butyrate
Vinyl ortho-chloro-phenoxy acetate
Vinyl para-chloro-phenoxy acetate
Vinyl meta-chloro-phenoxy acetate
Vinyl para-bromo-phenoxy valerate
Vinyl ortho-chloro-phenoxy hexanoate
Vinyl dichloro-phenoxy beta-ethyl propionate
Vinyl trichloro-phenoxy isobutyrate The present invention is based on my discovery that new and valuable polymers and copolymers of particular utility in the plastics and coating arts can be produced by polymerizing vinyl esters of halo-phenoxy substituted aliphatic monocarboxylic acids separately, mixed with each other, or mixed with other polymerizable material. The homogeneous and heterogeneous polymers vary from viscous masses to rubbery and hard, solid bodies, depending, for example, upon the extent of polymerization and the particular polymerizable or other modifying agent, if any, which is incorporated therewith. Heat, light, or heat and light may be used to effect polymerization, although under such conditions the rate of polymerization is relatively slow. Hence, to accelerate the polymerization I prefer to use a catalyst, accompanied by heat, light or heat and light. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic or of the aliphatic-aromatic acid series, e. g., benzoyl peroxide, acetyl benzoyl peroxide, etc., various per-compounds such as perborates, persulfates, perchlorates, etc., aluminum salts such as the halides, e. g., aluminum chloride, organic and inorganic acids such as methacrylic acid, hydrofluoric acid, etc., metal compounds of the unsaturated acids such, for instance, as cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole. The rate of polymerization and the properties of the final product vary with the time, temperature, and if a catalyst is used, also with the catalyst concentration. Polymerization of the individual or mixed esters or of polymerizable compositions containing these esters may be effected at from room temperature to temperatures above 100° C., for example about 130° C., but ordinarily I use temperatures within the range of 60° C. to 120° C. in causing polymerization.

Some of the polymeric esters of this invention are clear, colorless, transparent or opaque, rubbery, ductile bodies. Others are soft, free-flowing, viscous masses at temperatures of about 100° C., yet highly viscous or soft, slightly mobile masses at room temperature. Some are hard solids while others possess properties intermediate to hard solids and dense, mobile, viscous masses. In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including liquid hydrocarbons such as mineral oil. This property of high plastic flow can be used to great commercial advantage in molding processes by interpolymerizing the monomers with other bodies of low plastic flow, thereby imparting the desired flow characteristics to the end-products. The viscous polymers of this invention also may be used as plasticizers by being milled, for example, into a polymer which is too brittle at room temperature to give a final product having the desired degree of plasticity.

In other cases, for example where it is desired to raise the softening point, to decrease the solubility, or to produce insoluble, infusible or insoluble and infusible products, the vinyl esters may be copolymerized with a selected monomeric or partially polymerized compound, which in the monomeric state possesses a plurality of polymerizable

groups.

Any compound containing at least one polymerizable

grouping in its molecular structure may be copolymerized with the vinyl esters. This is rather surprising in view of the fact that the closely related vinyl acetate will not copolymerize with styrene. As the examples later show, vinyl para-chloro-phenoxy acetate does copolymerize with styrene.

Examples of other compounds which contain at least one

grouping and which may be copolymerized with the vinyl esters are:

Styrene
Ethyl methacrylate
Methyl acrylate
Propyl alpha-chloro-arcylate
Methyl methacrylate
Para-chloro-styrene
Vinyl acetate
Allyl acrylate
Allyl methacrylate
Methallyl acrylate
Vinyl ethyl ether
Divinyl ether
Vinylidene chloride
Ethylene dimethacrylate
Glyceryl triacrylate
Ethylene diacrylate
Acrylonitrile
Methacrylonitrile
Diallyl phthalate
Dimethallyl itaconate In order that those skilled in the art better may understand how the present invention may be carried into effect, the following examples are given by way of illustration. All parts are by weight.

*Example 1*

100 parts vinyl para-chloro-phenoxy acetate and 0.25 part of benzoyl peroxide were heated in a closed container for 80 hours at 60° C. A soft, rubbery, solid polymer was obtained.

*Example 2*

A mixture of each of the following monomers in the ratio of 80 parts of monomer to 20 parts of vinyl para-chloro-phenoxy acetate were heated in a closed container with 0.25 part of benzoyl peroxide at the temperatures and for the times indicated below in the table:

| Monomer | Heating schedule | Product |
|---|---|---|
| (a) Styrene | 120 hrs. at 60° C. Then 12 hrs. at 100° C. | Very hard, colorless solid. |
| (b) Acrylonitrile | Same as (a) | High melting, white powder. |
| (c) Ethyl alpha-bromo acrylate. | Same as (a) | Tacky, rubbery solid. |
| (d) Benzyl acrylate | Same as (a) | Rubbery, colorless solid. |
| (e) Para-chloro-benzyl acrylate. | Same as (a) | Tacky, semi-solid. |
| (f) Ethyl methacrylate | Same as (a) | Very hard, colorless solid. |
| (g) Benzyl methacrylate | Same as (a) | Do. |
| (h) Methacrylic nitrile | Same as (a) | Do. |
| (i) Di-ethyl itaconate | Same as (a) | Do. |
| (j) Di-allyl phthalate | Same as (a) | Fairly hard, infusible solid. |
| (k) Di-allyl itaconate | Same as (a) | Very hard, infusible solid. |
| (l) Vinyl acetate | 48 hrs. at room temperature, 120 hrs. at 40° C. 12 hrs. at 100° C. | Hard, colorless solid. |
| (m) Ethyl acrylate | Same as (l) | Colorless, rubbery solid. |
| (n) Methyl acrylate | Same as (l) | Do. |
| (o) Methyl methacrylate | Same as (l) | Very hard, colorless solid. |

The following illustrates the difference in properties which may be obtained by varying the ratio of the copolymerizing monomers. In all cases 0.25% benzoyl peroxide, based on the weight of the monomeric mixture, was added. Polymerization was carried out by leaving the sealed containers at room temperature for twenty days in subdued sunlight followed by direct exposure to sunlight at room temperature for four days. After removing the samples from the sealed containers, portions of each were tested on a hot plate heated to 210° C. The observations are recorded in the following table under "Action at 210°." Samples of each were also molded under a pressure of 5625 pounds per square inch for 1 minute at 135° to 140° C. followed by cooling the mold to 40° C. before releasing the pressure and ejecting the molded piece. The impact strength in foot pounds and flexural strength in pounds per square inch were measured in a Louis Schopper Dynstat machine on samples cut from the molded pieces. The results, which are the average of three determinations, are recorded in the following table:

| Ratio vinyl chloride: vinyl para-chloro phenoxy acetate | Action at 210° | Color of molded piece | Impact strength | Flexural strength |
|---|---|---|---|---|
| 100:0 | Softens slightly, darkens. | Darkened | 0.030 | 8,983 |
| 99:1 | Softens, darkens. | Darkened less than above. | 0.049 | 8,513 |
| 95:5 | Can be pulled into threads. | Clear, no discoloration. | 0.045 | 8,817 |
| 90:10 | do | Very slight discoloration. | 0.137 | 14,733 |
| 80:20 | Melts, can be pulled into rubbery fibers. | Darkened | Too soft to measure. | |
| 70:30 | Melts, can be pulled into very fine fibers. | do | Do. | |

The above table shows that some of the copolymers are very suitable for drawing into fibers. It also shows that optimum strength is obtained when the ratio of vinyl chloride to vinyl para-chloro-phenoxy acetate is of the order of 90 to 10. Optimum heat stability is obtained with a ratio in the order of 95 to 5.

It will be understood, of course, by those skilled in the art that my invention is not limited to the production of interpolymers of vinyl para-chloro-phenoxy acetate with the particular compounds given in the above illustrative examples and that instead of using vinyl para-chloro-phenoxy acetate I may use other vinyl esters of halo-phenoxy substituted aliphatic monocarboxylic acids, numerous examples of which previously have been given. Likewise, instead of the monomers which contain a polymerizable

grouping and which were copolymerized with the vinyl para-chloro-phenoxy acetate in the above examples, I may use other compounds which contain a polymerizable

grouping, examples of which hereinbefore have been mentioned. Also, instead of benzoyl peroxide, other polymerization catalysts may be employed, for instance polymerization accelerators such as previously named.

In certain cases, instead of polymerizing a single vinyl ester of a halo-phenoxy substituted aliphatic monocarboxylic acid, I may copolymerize a single or a plurality of such esters either with a single compound or with a plurality of compounds each containing at least one polymerizable

grouping. In this way it is possible to obtain a composition comprising a mixture of interpolymers best adapted to meet a particular service application.

Although in the foregoing examples I have shown an interpolymerization product of a minor proportion (approximately 1 to 30% by weight of the whole) of a vinyl ester of a halo-phenoxy substituted aliphatic monocarboxylic acid, it will be understood, of course, that the invention is not limited to these particular proportions of components. Mainly for economic reasons I prefer that the vinyl ester of a halo-phenoxy aliphatic monocarboxylic acid does not exceed substantially 50% by weight of the mixed polymerizable materials, but the use of higher amounts is not precluded, for example, up to 90 or 95% of the whole. Although I have shown under the above examples the production of a copolymer having as little as 1% of a vinyl ester of a halo-phenoxy aliphatic monocarboxylic acid with 99% of a compound containing at least one polymerizable

grouping, ordinarily in the preparation of the copolymers of this invention I prefer that the vinyl ester constitute at least 5% by weight of the mixed starting materials. In general, the proportions will be varied depending upon the particular properties desired in the interpolymer.

The interpolymerization products of this invention have a wide range of properties. Depending, for example, upon the particular vinyl ester of a halo-phenoxy substituted monocarboxylic acid and the particular compound containing at least one

grouping, the particular proportions thereof, the conditions of polymerization (temperature, time, pressure, presence or absence of catalyst, kind of catalyst used, if any, as well as the catalyst concentration, etc.) and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating or impregnating applications where the presence of a small amount of solvent in the cured composition is not objectionable, the mixed polymerizable materials may be diluted with volatile or non-volatile solvents to viscosities best adapted to meet the particular service application, and then may be copolymerized after application of the solution to the particular article to be coated or coated and impregnated. By suitable selection of the starting materials and the conditions of interpolymerization, interpolymers can be obtained in an insoluble, infusible state practically resistant to the destructive effect of other chemical bodies such as acids, bases, solvents and the like.

The simple and mixed monomers may be converted to polymers or interpolymers in molds with or without the application of pressure, in the presence of a material which is a solvent for the monomer but not for the polymer, or one which is a solvent for both monomer and polymer, or one which is not a solvent for either the monomer or polymer so that spongy or granulated polymeric modifications are obtained.

These new compositions may be used alone or with fillers, dyes, pigments, opacifiers, lubricants, plasticizers or other modifying bodies in, for example, casting, molding and laminating applications, and as adhesives, impregnants and surface coating materials.

As modifying agents various fillers may be used, for example, wood flour, alpha cellulose in flock form, sand, powdered or flake mica, cellulosic materials such as cellulose itself, regenerated cellulose, cellulose ethers, sheets or cuttings of paper, cloth, canvas, etc., asbestos in powdered or long or short fiber length, short or long wood fibers, synthetic or natural continuous threaded fibers, glass fibers in continuous filament or fabric (woven or felted) form, etc.

The modifying bodies also may take the form of high molecular weight bodies with or without resinous characteristics, for example, partially hydrolyzed wood products, lignin, proteins, protein-aldehyde condensation products, furfural condensation products, phenol-aldehyde condensation products, urea-aldehyde condensation products, aniline-aldehyde condensation products, sulfonamide-aldehyde condensation products, natural gums and resins such as copal, shellac, rosin, etc., polyvinyl formal, synthetic linear condensation superpolymers, e. g., the superpolyamides, polyhalogenated aromatic derivatives, etc.

In coating, impregnating and similar applications the monomeric or partly polymerized materials of this invention, with or without added solvent, may be applied to the object to be treated and polymerized as hereinbefore described, with or without the application of pressure, to form the polymer or copolymer in situ. These new synthetic materials may be used as impregnants for many porous bodies, such as cork, pottery, felts, or fabricated bodies with interstices, such as the windings of electrical coils, netted fibers, interwoven fibrous materials, etc. They also may be used for protectively coating impervious articles such as metals or for coating or coating and impregnating articles such as paper, wood, cloth, glass fibers in felted, woven or other form, concrete, linoleum, synthetic boards, etc. These new synthetic bodies also may be used in making laminated fibrous sheet materials wherein superposed layers of cloth, paper, etc., are firmly bonded together with the synthetic body.

The simple or mixed monomers or partial polymers, with or without modifying agents, may be cast and molded under heat or under heat and pressure. The solid thermoplastic and thermosetting bodies of this invention also may be molded by injection, extrusion or compression molding technique whereby they are converted (heat- and pressure-hardened in the case of thermosetting bodies) into a variety of molded articles of manufacture for industrial, household and novelty uses.

What I claim as new and desire to secure by Letters Patent of the United States is:

1. A composition comprising the product of polymerization of a vinyl ester of a halo-phenoxy substituted aliphatic monocarboxylic acid having the structural formula

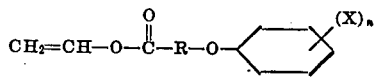

wherein R is a divalent saturated aliphatic hydrocarbon radical, X is a halogen selected from the class consisting of chlorine and bromine, and n is an integer which is at least one and not more than five.

2. A composition comprising the product of polymerization of ingredients comprising (1) a vinyl ester of a halo-phenoxy substituted aliphatic monocarboxylic acid having the structural formula

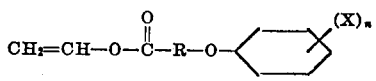

wherein R is a divalent saturated aliphatic hydrocarbon radical, X is a halogen selected from the class consisting of chlorine and bromine, and n is an integer which is at least one and not more than five, and (2) a compound containing at least one polymerizable

grouping selected from the class consisting of vinyl hydrocarbons, vinyl halo-hydrocarbons, vinyl halides, vinylidene halides, vinyl ethers, acrylic nitrile, alpha-alkyl substituted acrylic nitriles, acrylic esters of saturated alcohols, alpha-alkyl substituted acrylic esters of saturated alcohols, alpha-halo substituted acrylic esters of saturated alcohols, vinyl alcohol esters and allyl alcohol esters.

3. A composition as in claim 2 wherein R is a divalent saturated aliphatic hydrocarbon radical containing at least one and not more than six carbon atoms.

4. A composition as in claim 2 wherein R is a divalent saturated aliphatic hydrocarbon radical containing at least one and not more than six carbon atoms, and n is an integer which is at least one and not more than three.

5. A composition comprising the product of polymerization of vinyl monochloro-phenoxy acetate.

6. A composition comprising the product of polymerization of vinyl para-chloro-phenoxy acetate.

7. A composition comprising the product of polymerization of vinyl dichloro-phenoxy acetate.

8. A composition comprising the product of polymerization of vinyl monocholro-phenoxy propionate.

9. A composition comprising the product of polymerization of ingredients comprising (1) vinyl monochloro-phenoxy acetate and (2) a compound containing at least one polymerizable

grouping selected from the class consisting of vinyl hydrocarbons, vinyl halo-hydrocarbons, vinyl halides, vinylidene halides, vinyl ethers, acrylic nitrile, alpha-alkyl substituted acrylic nitriles, acrylic esters of saturated alcohols, alpha-alkyl substituted acrylic esters of saturated alcohols, alpha-halo substituted acrylic esters of saturated alcohols, vinyl alcohol esters and allyl alcohol esters.

10. A composition comprising the product of polymerization of ingredients comprising (1) vinyl parachloro-phenoxy acetate and (2) a compound containing at least one polymerizable

grouping selected from the class consisting of vinyl hydrocarbons, vinyl halo-hydrocarbons, vinyl halides, vinylidene halides, vinyl ethers, acrylic nitrile, alpha-alkyl substituted acrylic nitriles, acrylic esters of saturated alcohols, alpha-alkyl substituted acrylic esters of saturated alcohols, alpha-halo substituted acrylic esters of saturated alcohols, vinyl alcohol esters and allyl alcohol esters.

11. A composition comprising the product of polymerization of ingredients comprising (1) vinyl dichloro-phenoxy acetate and (2) a compound containing at least one polymerizable

grouping selected from the class consisting of vinyl hydrocarbons, vinyl halo-hydrocarbons, vinyl halides, vinylidene halides, vinyl ethers, acrylic nitrile, alpha-alkyl substituted acrylic nitriles, acrylic esters of saturated alcohols, alpha-alkyl substituted acrylic esters of saturated alcohols, alpha-halo substituted acrylic esters of saturated alcohols, vinyl alcohol esters and allyl alcohol esters.

12. A composition comprising the product of polymerization of ingredients comprising (1) vinyl monochloro-phenoxy propionate and (2) a compound containing at least one polymerizable

grouping selected from the class consisting of vinyl hydrocarbons, vinyl halo-hydrocarbons, vinyl halides, vinylidene halides, vinyl ethers, acrylic nitrile, alpha-alkyl substituted acrylic nitriles, acrylic esters of saturated alcohols, alpha-alkyl substituted acrylic esters of saturated alcohols, alpha-halo substituted acrylic esters of saturated alcohols, vinyl alcohol esters and allkyl alcohol esters.

13. A composition comprising the product of polymerization of ingredients comprising (1) a vinyl ester of a halo-phenoxy substituted aliphatic monocarboxylic acid having the structural formula

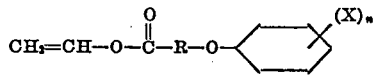

wherein R is a divalent saturated aliphatic hydrocarbon radical, X is a halogen selected from the class consisting of chlorine and bromine, and n is an integer which is at least one and not more than five, and (2) diallyl itaconate.

14. A composition comprising the product of polymerization of ingredients comprising a vinyl chloro-phenoxy acetate and a vinyl halide.

15. The method of producing new synthetic compositions which comprises forming a mixture containing (1) a vinyl ester of a halo-phenoxy substituted aliphatic monocarboxylic acid having the general formula

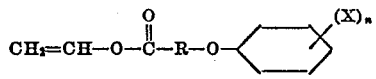

wherein R is a divalent saturated aliphatic hydrocarbon radical, X is a halogen selected from the class consisting of chlorine and bromine, and n is an integer which is at least one and not more than five, and (2) a compound containing at least one polymerizable

grouping selected from the class consisting of vinyl hydrocarbons, vinyl halo-hydrocarbons, vinyl halides, vinylidene halides, vinyl ethers, acrylic nitrile, alpha-alkyl substituted acrylic nitriles, acrylic esters of saturated alcohols, alpha-alkyl substituted acrylic esters of saturated alcohols, alpha-halo substituted acrylic esters of saturated alcohols, vinyl alcohol esters and allyl alcohol esters, and treating the resulting mixture to effect copolymerization between the said components.

GAETANO F. D'ALELIO.

CERTIFICATE OF CORRECTION.

Patent No. 2,335,651. November 30, 1943.

GAETANO F. D'ALELIO.

It is hereby certified that error appears in the printed specification of the above numbered patent requiring correction as follows: Page 5, first column, line 6, claim 12, for "allkyl" read --allyl--; and that the said Letters Patent should be read with this correction therein that the same may conform to the record of the case in the Patent Office.

Signed and sealed this 25th day of January, A. D. 1944.

(Seal)

Henry Van Arsdale,
Acting Commissioner of Patents.